United States Patent
Zhang et al.

(10) Patent No.: US 12,432,732 B2
(45) Date of Patent: Sep. 30, 2025

(54) CHANNEL STATE INFORMATION FEEDBACK INFORMATION TRANSMISSION AND CONFIGURATION

(71) Applicant: ZTE Corporation, Guangdong (CN)

(72) Inventors: Chenchen Zhang, Guangdong (CN); Peng Hao, Guangdong (CN); Junfeng Zhang, Guangdong (CN); Xianghui Han, Guangdong (CN)

(73) Assignee: ZTE Corporation, Shenzhen (CN)

( * ) Notice: Subject to any disclaimer, the term of this patent is extended or adjusted under 35 U.S.C. 154(b) by 469 days.

(21) Appl. No.: 17/869,592

(22) Filed: Jul. 20, 2022

(65) Prior Publication Data

US 2022/0361162 A1    Nov. 10, 2022

Related U.S. Application Data

(63) Continuation of application No. PCT/CN2020/075391, filed on Feb. 14, 2020.

(51) Int. Cl.
*H04W 72/20* (2023.01)
*H04B 7/06* (2006.01)
(Continued)

(52) U.S. Cl.
CPC .......... *H04W 72/20* (2023.01); *H04B 7/0626* (2013.01); *H04L 1/1812* (2013.01); *H04L 5/0053* (2013.01)

(58) Field of Classification Search
None
See application file for complete search history.

(56) References Cited

U.S. PATENT DOCUMENTS

2012/0220286 A1*  8/2012  Chen ............... H04W 24/10
                                              455/422.1
2014/0003345 A1*  1/2014  Chu ................ H04L 1/0026
                                              370/328
(Continued)

FOREIGN PATENT DOCUMENTS

CN          102437901 A       5/2012
CN          103039026 A       4/2013
(Continued)

OTHER PUBLICATIONS

Texas Instruments, "CSI feedback modes for DL CoMP", 3GPP TSG RAN WG1 Meeting #68bis, Jeju, South Korea, R1-121208, Mar. 2012 (3 pages).

(Continued)

*Primary Examiner* — Otis L Thompson, Jr.
(74) *Attorney, Agent, or Firm* — Perkins Coie LLP

(57) ABSTRACT

Methods, systems, and devices related to digital wireless communication, and more specifically, to techniques related to triggering feedback of channel state information. In one exemplary aspect, a method for wireless communication is disclosed. The method includes receiving, by a terminal, a first message from a wireless communication node. The method also includes transmitting, by the terminal, a feedback message to the wireless communication node via a first channel responsive to receiving the first message from the wireless communication node, the feedback message including at least one set of channel status information.

21 Claims, 6 Drawing Sheets

(51) Int. Cl.
*H04L 1/1812* (2023.01)
*H04L 5/00* (2006.01)

(56) References Cited

U.S. PATENT DOCUMENTS

| | | | | |
|---|---|---|---|---|
| 2014/0233419 A1* | 8/2014 | Cheng | .............. | H04W 72/542 |
| | | | | 370/252 |
| 2019/0036569 A1* | 1/2019 | Deng | .............. | H04B 7/0417 |
| 2019/0199420 A1* | 6/2019 | Faxér | .............. | H04L 5/0057 |
| 2019/0342911 A1 | 11/2019 | Talarico et al. | | |
| 2020/0128533 A1* | 4/2020 | Li | .............. | H04L 1/1671 |
| 2020/0162134 A1 | 5/2020 | Kakishima et al. | | |
| 2020/0178241 A1* | 6/2020 | Wu | .............. | H04L 5/0055 |
| 2020/0259625 A1* | 8/2020 | Papasakellariou | .............. | H04B 7/0456 |
| 2020/0260428 A1* | 8/2020 | Xu | .............. | H04W 76/27 |
| 2020/0295903 A1* | 9/2020 | Faxér | .............. | H04W 24/10 |
| 2020/0350967 A1* | 11/2020 | Xu | .............. | H04B 7/022 |
| 2020/0403678 A1 | 12/2020 | Shi et al. | | |
| 2020/0403758 A1* | 12/2020 | Song | .............. | H04L 5/0048 |
| 2021/0021315 A1* | 1/2021 | Song | .............. | H04W 24/10 |
| 2021/0037555 A1* | 2/2021 | Papasakellariou | .............. | H04L 1/0026 |
| 2021/0045173 A1* | 2/2021 | Takeda | .............. | H04L 5/1469 |
| 2021/0212033 A1* | 7/2021 | Islam | .............. | H04L 1/0026 |
| 2021/0218451 A1* | 7/2021 | Li | .............. | H04W 72/53 |
| 2021/0250073 A1* | 8/2021 | Huang | .............. | H04L 1/0026 |
| 2021/0360610 A1* | 11/2021 | Kim | .............. | H04L 1/1858 |
| 2021/0385810 A1* | 12/2021 | Sasaki | .............. | H04W 72/21 |
| 2022/0007399 A1* | 1/2022 | Rastegardoost | .............. | H04L 1/1854 |
| 2022/0078781 A1* | 3/2022 | Zhou | .............. | H04L 5/0001 |
| 2022/0094479 A1* | 3/2022 | Gao | .............. | H04L 5/0057 |
| 2022/0103330 A1* | 3/2022 | Li | .............. | H04L 1/1671 |
| 2023/0016768 A1* | 1/2023 | Yang | .............. | H04W 72/23 |

FOREIGN PATENT DOCUMENTS

| | | | |
|---|---|---|---|
| CN | 104253677 | A | 12/2014 |
| CN | 104284429 | A | 1/2015 |
| CN | 109495230 | A | 3/2019 |
| CN | 109644365 | A | 4/2019 |
| CN | 110535572 | A | 12/2019 |
| CN | 110582960 | A | 12/2019 |
| EP | 3706490 | A1 | 9/2020 |
| WO | 2014110759 | A1 | 7/2014 |
| WO | 2014208924 | A1 | 12/2014 |
| WO | 2017/171299 | A1 | 10/2017 |
| WO | 2017/200307 | A1 | 11/2017 |
| WO | 2018/228523 | A1 | 12/2018 |
| WO | 2019069234 | A1 | 4/2019 |
| WO | 2019098693 | A1 | 5/2019 |
| WO | 2019216620 | A1 | 11/2019 |

OTHER PUBLICATIONS

International Search Report and Written Opinion for International Application No. PCT/CN2020/075391, mailed on Nov. 12, 2020 (6 pages).
Nokia et al., "On UCI Enhancements for URLLC," 3GPP TSG RAN WG1 Ah Hoc Meeting 1901, Taipei, Taiwan, R1-1900928, 13 pages, Jan. 2019.
Ericsson, "UCI Enhancements for NR URLLC," 3GPP TSG RAN WG1 Meeting #96, Athens, Greece, R1-1901594, 10 pages, Feb. 2019.
Extended European Search Report for European Patent Application No. 20889324.8, mailed Dec. 2, 2022 (11 pages).
CNIPA, First Office Action for Chinese Application No. 202080092355.1, mailed on Mar. 25, 2024, 20 pages with unofficial English translation.
CNIPA, Second Office Action for Chinese Application No. 202080092355.1, mailed on Aug. 5, 2024, 21 pages with unofficial English translation.
CNIPA, Notice of Grant for Chinese Application No. 202080092355.1, mailed on Nov. 15, 2024, 3 pages with unofficial English translation.
Samsung, "BSI/CSI Transmission on PUCCH," 3GPP TSG RAN WG1 NR Ad-Hoc #2, R1-1710717, Qingdao, China, Jun. 27-30, 2017, 3 pages.
Communication pursuant to Article 94(3) EPC mailed Apr. 2, 2025 for European Patent Application No. 20 889 324.8, 5 pages.

* cited by examiner

CHANNEL STATE INFORMATION FEEDBACK INFORMATION TRANSMISSION AND CONFIGURATION

CROSS REFERENCE TO RELATED APPLICATIONS

This patent document is a continuation of and claims benefit of priority to International Patent Application No. PCT/CN2020/075391, filed on Feb. 14, 2020. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to triggering feedback of channel state information.

In one exemplary aspect, a method for wireless communication is disclosed. The method includes receiving, by a terminal, a first message from a wireless communication node. The method also includes transmitting, by the terminal, a feedback message to the wireless communication node via a first channel responsive to receiving the first message from the wireless communication node, the feedback message including at least one set of channel status information.

In another exemplary aspect, a method for wireless communication is disclosed. The method includes transmitting, by a wireless communication node, a first message to a terminal, the first message including an indication to transmit at least one set of channel status information to the wireless communication node. The method also includes receiving, by the wireless communication node, a feedback message from the terminal via a first channel responsive to transmitting the first message to the terminal.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

Some embodiments may preferably implement the following solutions, written in a clause-format.

1. A solution for wireless communication, comprising: receiving, by a terminal, a first message from a wireless communication node; and transmitting, by the terminal, a feedback message to the wireless communication node via a first channel responsive to receiving the first message from the wireless communication node, the feedback message including at least one set of channel status information.

2. The solution of clause 1, further comprising: multiplexing, by the terminal, the at least one set of channel status information and hybrid automatic repeat request acknowledgement (HARQ-ACK) feedback information in a first resource of the first channel, wherein the first channel is a physical uplink control channel (PUCCH), and wherein the first resource is a first PUCCH resource of the first channel indicated by a first downlink control information (DCI).

3. The solution of clause 1, wherein the first channel is a PUCCH, wherein the feedback message included in a second PUCCH resource that includes a second type of channel state information feedback, and wherein the second PUCCH resource is indicated by a first DCI or a second DCI that triggers the second type of channel state information feedback.

4. The solution of clause 1, wherein the first message includes a PUCCH resource indicator field that is included in a DCI, wherein the feedback message is transmitted to the wireless communication node via a PUCCH resource indicated by the PUCCH resource indicator field that is included in the DCI.

5. The solution of clause 1, wherein the first message includes a slot offset indicator field included in a DCI, wherein the feedback message is transmitted to the wireless communication node via the first channel in a slot, and wherein the slot is indicated by the slot offset indicator field included in the DCI.

6. The solution of clause 5, wherein the slot offset indicator field includes any of a first time offset between a time unit in receiving the first message and a time unit in transmitting the feedback message in the first channel, a second time offset between an ending time unit in receiving the first message and a starting time unit in transmitting the feedback message in the first channel, a third time offset between a time unit in transmitting HARQ-ACK feedback information and the time unit in transmitting the feedback message in the first channel, and a fourth time offset between an ending time unit in transmitting HARQ-ACK feedback information and the starting time unit in transmitting the feedback message in the first channel.

7. The solution of clause 1, wherein the feedback message is transmitted by the terminal responsive to expiration of a processing delay beginning upon reception of the first message, wherein the processing delay includes a number of time units between an ending time unit of reception of the first message and a starting time unit of the feedback message transmitted via the first channel.

8. The solution of clause 1, wherein the at least one set of channel status information includes a first type of channel state information (CSI) feedback, the first type of CSI feedback including a series of CSI reports prepared by the terminal, and wherein a time duration between an ending time unit of a first DCI and a starting time unit of the first PUCCH resource is equal or greater than the processing delay, and wherein the first type of CSI feedback is transmitted in the first PUCCH resource by the terminal.

9. The solution of clauses 1, wherein the at least one set of channel status information includes a second type of CSI feedback, the second type of CSI feedback including a series of CSI reports that were not ready when transmitting the first PUCCH resource by the terminal, and wherein the time duration between the ending time unit of the first DCI and the starting time unit of the second PUCCH resource is greater than the processing delay.

10. The solution of clause 9, wherein the terminal ignores an indication for a second PUCCH resource indicated in a DCI that triggers CSI feedback if the terminal does not identify any information indicative of the second type of CSI feedback.

11. The solution of clause 9, further comprising: cancelling, by the terminal, the second type of CSI feedback based on at least one of: determining that a time duration between an ending time unit of the first message and a starting time unit of the first channel is larger than a first time threshold that is pre-defined, determining that a time duration between an ending time unit of the first message and a starting time unit of the first channel is larger than a first time threshold that is configured by the wireless communication node through RRC signaling, determining that there is no PUCCH resource indicator included in the first message, determining that there is no slot offset indicator indicated in the first message, determining that a trigger state indicated by a subsequent DCI corresponds to a trigger state in the first message, determining that a CSI report included in a subsequent type of CSI feedback corresponds to a CSI report included in the first message.

12. The solution of clause 1, wherein the first channel is a configured grant PUSCH, wherein the at least one set of channel status information is included in the configured grant PUSCH.

13. The solution of clause 12, further comprising: determining, by the terminal, that the configured grant PUSCH is one of multiple first type configured grant PUSCH resources or one of multiple second type configured grant PUSCH resources, wherein the first type configured grant PUSCH resources or second type configured grant PUSCH resources are predefined or configured by the wireless communication node.

14. The solution of clause 12, wherein the at least one set of channel status information is transmitted in a recently available resource of the configured grant PUSCH or in a configured grant PUSCH resource indicated by the wireless communication node.

15. The solution of clause 12, wherein the at least one set of channel status information is transmitted in a configured grant PUSCH indicated by a DCI.

16. The solution of clause 1, further comprising: concatenating, by the terminal, a number of sets of channel status information according to an order in which each set of channel status information was triggered, wherein each set of channel status information includes the first type of CSI feedback or the second type of CSI feedback.

17. The solution of clause 16, further comprising: determining, by the terminal, that the at least one set of channel status information exceeds a maximum bit rate of a PUCCH resource associated with the feedback message and/or a maximum number of available physical resource blocks (PRBs) for the PUCCH resource associated with the feedback message; and sorting, by the terminal, each set of channel status information according to the order in which each set of channel status information was triggered.

18. The solution of clause 1, further comprising: inspecting, by the terminal, the first message to identify a CSI report priority indication field that triggers transmission of the feedback message; determining, by the terminal, a first set of channel status information with a greater priority than that of a second set of channel status information; and transmitting, by the terminal, the feedback message that includes the first set of channel status information based on determining that the first set of channel status information with the greater priority than that of the second set of channel status information.

19. The solution of clause 1, further comprising: inspecting, by the terminal, the first message to identify a downlink (DL) grant priority indicator; determining, by the terminal, a priority of each set of channel status information; and adding, by the terminal, a set of channel status information with a highest priority to the feedback message.

20. The solution of clause 1, wherein the first message includes information indicative of a processing delay in transmission of the feedback message, wherein the processing delay is provided as any of a slot, a sub-slot, and/or an orthogonal frequency-division multiplexing (OFDM) symbol.

21. The solution of clause 1, further comprising: dividing, by the terminal, a number of instances of each set of channel status information into multiple PUCCH resources, wherein the multiple PUCCH resources are included in the feedback message.

22. The solution of clause 1, wherein the first message is a downlink (DL) grant message that includes an added PUCCH resource indicator in a channel state information (CSI) field of the first message, wherein the added PUCCH resource indicator indicates a first PUCCH resource and triggers the terminal to send each set of channel status information in the first PUCCH resource via the feedback message.

23. The solution of clause 1, further comprising: responsive to determining that the first message includes an indication to transmit the at least one set of channel status information in the feedback message, selecting, the terminal, a PUCCH resource from a list of aperiodic PUCCH resources to feedback the at least one set of channel status information in the feedback message.

24. The solution of clause 1, wherein the feedback message includes at least one HARQ-ACK information bit, at least one HARQ-ACK Cyclic Redundancy Error (CRC) check bit, at least one aperiodic channel state information (A-CSI) bit, and at least one A-CSI CRC check bit.

25. The solution of clause 24, wherein the at least one HARQ-ACK information bit indicates a PDSCH transport block (TB) that is a NACK.

26. The solution of clause 1, wherein the feedback message includes channel quality information for one or more frequency domain resource units, wherein the frequency domain resource unit includes any of a downlink bandwidth part (BWP), a sub-band, and a physical resource block (PRB).

27. A solution for wireless communication, comprising: transmitting, by a wireless communication node, a first message to a terminal, the first message including an indication to transmit at least one set of channel status information to the wireless communication node; and receiving, by the wireless communication node, a feedback message from the terminal via a first channel responsive to transmitting the first message to the terminal.

28. The solution of clause 27, wherein the feedback message includes the at least one set of channel status information multiplexed with hybrid automatic repeat request acknowledgement (HARQ-ACK) feedback information in a first resource of the first channel, wherein the first channel is a physical uplink control channel (PUCCH), and wherein the first resource is a first PUCCH resource of the first channel indicated by a first downlink control information (DCI).

29. The solution of clause 27, wherein the first channel is a PUCCH, wherein the feedback message included in a second PUCCH resource that includes a second type of channel state information feedback, and wherein the second PUCCH resource is indicated by a first DCI or a second DCI that triggers the second type of channel state information feedback.

30. The solution of clause 27, wherein the first message includes a PUCCH resource indicator field that is included in a DCI, wherein the feedback message is transmitted to the wireless communication node via a PUCCH resource indicated by the PUCCH resource indicator field that is included in the DCI.

31. The solution of clause 27, wherein the first message includes a slot offset indicator field included in a DCI, wherein the feedback message is transmitted to the wireless communication node via the first channel in a slot, and wherein the slot is indicated by the slot offset indicator field included in the DCI.

32. The solution of clause 31, wherein the slot offset indicator field includes any of a first time offset between a time unit in transmitting the first message and a time unit in receiving the feedback message in the first channel, a second time offset between an ending time unit in transmitting the first message and a starting time unit in receiving the feedback message in the first channel, a third time offset between a time unit in receiving HARQ-ACK feedback information and the time unit in receiving the feedback message in the first channel, and a fourth time offset between an ending time unit in receiving HARQ-ACK feedback information and the starting time unit in receiving the feedback message in the first channel.

33. The solution of clause 27, wherein the feedback message is transmitted by the terminal responsive to expiration of a processing delay beginning upon reception of the first message, wherein the processing delay includes a number of time units between an ending time unit of reception of the first message and a starting time unit of the feedback message transmitted via the first channel.

34. The solution of clause 27, wherein the at least one set of channel status information includes a first type of channel state information (CSI) feedback, the first type of CSI feedback including a series of CSI reports prepared by the terminal, and wherein a time duration between an ending time unit of a first DCI and a starting time unit of the first PUCCH resource is equal or greater than the processing delay, and wherein the first type of CSI feedback is transmitted in the first PUCCH resource by the terminal.

35. The solution of clause 27, wherein the at least one set of channel status information includes a second type of CSI feedback, the second type of CSI feedback including a series of CSI reports that were not ready when receiving the first PUCCH resource by the terminal, and wherein the time duration between the ending time unit of the first DCI and the starting time unit of the second PUCCH resource is greater than the processing delay.

36. The solution of clause 27, wherein the first channel is a configured grant PUSCH, wherein the at least one set of channel status information is included in the configured grant PUSCH.

37. The solution of clause 36, wherein the wireless communication node configures at least one configured grant PUSCH resource as the first channel through RRC signaling, wherein the configured grant PUSCH resource is any of a second type configured grant PUSCH resource or a first type configured grant PUSCH resource.

38. The solution of clause 36, wherein the wireless communication node indicates an available configured grant PUSCH resource used for transmitting at least one set of channel status information in a DCI triggering the feedback message.

39. The solution of clause 36, wherein the wireless communication node configures a type of CSI feedback to be fed back in the configured grant PUSCH through RRC signaling, wherein the type of CSI feedback is one of the first type of CSI feedback and the second type of CSI feedback.

40. The solution of clauses 27, wherein a number of sets of channel status information in the feedback message are concatenated according to an order in which each set of channel status information was triggered, wherein each set of channel status information includes the first type of CSI feedback or the second type of CSI feedback.

41. An apparatus for wireless communication comprising a processor that is configured to carry out the solution of any of clauses 1 to 40.

42. A non-transitory computer readable medium having code stored thereon, the code when executed by a processor, causing the processor to implement a solution recited in any of clauses 1 to 40.

The details of one or more implementations are set forth in the accompanying attachments, the drawings, and the description below. Other features will be apparent from the description and drawings, and from the claims.

DETAILED DESCRIPTION

Figure 1:
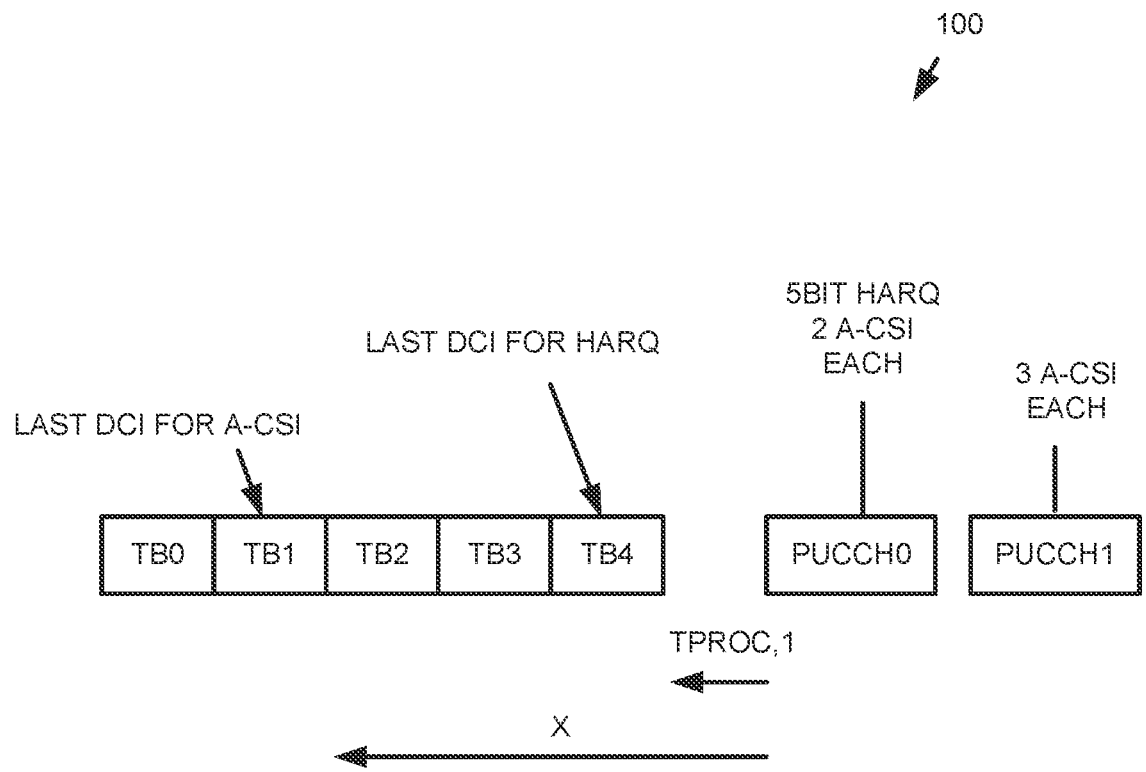
FIG. 1 is a block diagram of an example bit field depicting multiple transport blocks and multiple PUCCH resources.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Many networks have low latency and high reliability requirements in providing wireless communications (e.g., Ultra Reliable Low Latency Communications (URLLC)). In many cases, a terminal (or "user equipment (UE)") may feedback accurate and timely channel state information to a base station so that the base station can perform reasonable link adaptations tasks to ensure that wireless communications are in accordance with the low latency and high reliability requirements.

In some cases, feedback on aperiodic channel state information can only be triggered by a physical downlink control channel (PDCCH) carrying an uplink (UL) Grant. Feedback may be performed on a physical uplink shared channel (PUSCH) scheduled by the UL Grant. In these cases, if there is no UL data to send, the base station has to send a PDCCH carrying a UL Grant in order to trigger aperiodic channel state feedback. This may cause PDCCH blocking.

Accordingly, in many cases, it has been proposed that the PDCCH carrying a downlink (DL) Grant can be used to trigger aperiodic channel state information feedback, and the DL Grant can schedule PDSCH at the same time. This may trigger aperiodic channel state information feedback. This may occur when the base station has a scheduled PUSCH and the terminal needs feedback channel state information. This may include a UL Grant triggered aperiodic channel state information feedback. In some embodiment, when the base station has a scheduled PDSCH that requests the terminal to provide channel state information, the DL Grant can be used to trigger aperiodic channel state information feedback.

In many cases, it may be proposed that after the terminal decodes the PDSCH transport block (TB) to a negative acknowledgement (NACK), it can trigger the feedback of aperiodic channel state information, so that the aperiodic channel state information fed back can be applied to the retransmission link adaptation of the PDSCH TB.

After the terminal decodes a PDSCH according to the decoding result, an ACK or NACK may be generated for the PDSCH in the HARQ-ACK feedback and a HARQ-ACK feedback may be needed to be included in PUCCH feedback to the base station. For carrying PUCCH based on a plurality of PDSCH HARQ-ACK feedback, NR may introduce semi-static HARQ-ACK codebook and/or a dynamic HARQ-ACK codebook. For a HARQ codebook mode, the base station may indicate an indication of a slot of a PUCCH resource transmission the PRI according to a plurality of PDSCH of a K1, for a plurality of the final PDSCH of HARQ-ACK feedback carried last DCI the K1. K1 may indicate the offset between the slot where the DCI is located and the slot where the PUCCH is located, and the PRI may indicate the PUCCH Resource index.

In many cases, it has been proposed that for aperiodic channel state information triggered by DL Grant and/or NACK, the terminal feeds back to the base station on the PUCCH, which can facilitate timely feedback.
System Overview The present embodiments relate triggering feedback of channel state information. Particularly, the present embodiments provide methods to trigger accurate and timely feedback of channel state information.

Example Embodiment 1

A first example embodiment may relate to multiplexing A-CSI and HARQ-ACK and feeding the information back on a HARQ-ACK PUCCH. The system can predefine or the base station can semi-statically configure the minimum A-SCI processing delay for the terminal under a specific SCS according to the terminal's processing capability for A-CSI. The A-CSI processing delay can be defined as "X" time units, the time unit can be any of slot, sub slot, or OFDM symbol.

A-CSI feedback may be triggered according to the DL Grant sent by the base station to the terminal and/or triggered based on a decoding decision result by the terminal that the PDSCH scheduled by the DL Grant is NACK. Upon determining by the terminal that A-CSI feedback is triggered, the terminal may feedback A-CSI feedback to the base station.

Particularly, the processing delay "X" may include a number of time units between the ending time unit of the DL Grant that the UE receives to trigger the A-SCI feedback and the starting time unit of the A-CSI that the UE sends. The processing delay "X" can also include a number of time units between the ending time unit of the PDSCH received by the UE receiving the DL Grant scheduling and the starting time unit of the UE sending A-SCI.

For a DL Grant within the range of a HARQ-ACK codebook, the terminal can feedback the HARQ-ACK on the PUCCH resource indicated by a "PUCCH resource indicator" field and/or in a slot indicated by a "PDSCH-to-HARQ_feedback timing indicator" field in the last DL Grant. The codebook may indicative of whether the decoding result of all PDSCHs scheduled by one or multiple DL Grant is ACK or NACK reported, within all these DL Grant, the last DCI is the latest received by the terminal.

In some embodiments, if processing of the A-CSI is fast enough that the PUCCH resource carrying HARQ-ACK codebook can carry both HARQ-ACK and A-SCI, then both can be transmitted together in the same resource. However, if the processing is not fast enough, they can be transmitted separately using different PUCCH resources.

FIG. 1 is a block diagram 100 of an example bit field depicting multiple transport blocks and multiple PUCCH resources. As shown in FIG. 1, the bit field can include a series of transport blocks (TBs) (e.g., TB0, TB1, TB2, TB3, TB4). The bit field can also include one or more PUCCH resources (e.g., PUCCH0, PUCCH1).

The A-CSI minimum processing delay may be referred to as "X," where all triggered A-CSI can be divided into two parts, a first part can include one or more of the first A-CSI feedbacks that meets the minimum processing delay corresponding to "X," the feedback may be multiplexed on the HARQ-ACK PUCCH carrying the HARQ-ACK codebook feedback, which may include PUCCH0 as shown in FIG. 1, called as the first PUCCH resource. The second part may include one or more second A-CSI feedbacks that not meeting the minimum processing delay X until the starting OFDM symbol of the first PUCCH resource, so the one or more second A-CSI feedbacks may be included on another PUCCH Resource (e.g., PUCCH1 as shown in FIG. 1), called as the second PUCCH resource.

A determination of which PUCCH Resource used as the second PUCCH resource and on which time unit or from which time unit the terminal feedback the second PUCCH to the base station (the time unit can be called as the first time unit) can be performed based on any of the following.

In a first case, such a determination can include determining that the second PUCCH resource is a HARQ-ACK PUCCH resource corresponding to a next HARQ-ACK codebook feedback, the HARQ-ACK PUCCH resource corresponding to the next HARQ-ACK codebook feedback indicated by a next last DL Grant, and the first time unit is a time unit or a starting time unit for sending the next HARQ-ACK codebook, which may be indicated by the "PDSCH-to-HARQ feedback timing indicator" field in the next last DL Grant of the HARQ-ACK codebook.

In a second case, such a determination can be based on the indication in the DCI triggering the corresponding A-CSI feedback or in the last DL Grant. A PUCCH resource indicator field can be indicated by the DCI triggering the corresponding A-CSI feedback or by the last DL Grant to indicate the second PUCCH resource. A CSI timing indicator field can be indicated by the DCI triggering the corresponding A-CSI feedback or by the last DL Grant to indicate the first time unit. The terminal sends the corresponding A-SCI feedback in the second PUCCH resource indicated by the PUCCH resource indicator field, and/or the terminal sends the corresponding A-CSI feedback in the time unit or from the time unit indicated by the A-CSI timing indicator field.

In some embodiments, the A-CSI timing indicator field can indicate a time interval between the ending time unit of receiving the DCI indicating the A-CSI timing indicator and the starting time unit of transmitting the second PUCCH resource.

In some other embodiments, the A-SCI timing indicator field can indicate a time interval between an ending time unit of a PDSCH transmission scheduled or activated by the DCI including the A-CSI timing indicator and the starting time unit of transmitting the second PUCCH resource.

The second A-SCI feedback may be limited by the second PUCCH resource and the first time unit. Accordingly, when a condition is met, the terminal may cancel the second A-SCI feedback. The condition may include a A-CSI feedback cancellation time that is predefined by the system or semi-statically configured by the base station, which can be referred to as the first time threshold (in the unit of slot/sub slot/symbol). When the time interval between the first time unit and the second time unit can be greater than the first time threshold.

The condition may also include triggering the second A-SCI feedback in a DL Grant but the second PUCCH resource and/or the first time unit is not indicated by the DL Grant.

The condition may also include the first A-CSI feedback carried in the HARQ-ACK PUCCH can correspond to the next_HARQ-ACK codebook and the second A-CSI feedback can include the same CSI Report.

The condition may also include the second A-CSI feedback includes the same A-CSI report transmitted in a first PUCCH resource by the terminal.

The condition may also include the second A-CSI feedback and a recent first A-CSI feedback include the A-CSI reports on one or more same carriers.

The condition may also include the at least one CSI report of recent first A-CSI feedback corresponds to the same trigger state as the A-CSI report of the second A-SCI feedback.

Specifically, the second time unit can be any of the ending time unit of receiving the DCI indicating the A-CSI timing indicator, the ending time unit of a PDSCH transmission scheduled or activated by the DCI including the A-CSI timing indicator, an ending time unit of sending the first PUCCH resource, an starting time unit of sending the first PUCCH resource.

Example Embodiment 2

A second example embodiment may include providing an independent indication of a PUCCH resource and on which the A-CSI should feedback. A-CSI feedback may be triggered according to whether the DL Grant sent by the base station to the terminal and/or the terminal's decoding decision result of the PDSCH scheduled by the DL Grant is NACK. Once the terminal thinks that it has triggered A-CSI feedback, then the terminal may feed back A-CSI to the base station.

The base station may indicate to the terminal which PUCCH resource to use to feedback the A-SCI in the DL Grant that triggers the A-CSI feedback. Such an indication may include a base station dynamic indication method, which may include adding a PUCCH resource indicator for CSI field in the DL Grant that triggers A-CSI feedback, which may be referred to the first PUCCH resource indicator field and indicates the PUCCH resource that used to feedback A-CSI.

Such an indication may also include a semi-static configuration of base stations. An aperiodic CSI report type feedback on PUCCH may be added. Particularly, a periodicOnPUCCH can be added as a new reportConfigType.

The base station can also configure the pucch-csi-resourcelist in the specific configuration of the aperiodicOn-PUCCH, and one or more PUCCH resources for feedback A-CSI in the pucch-csi-resourcelist. If the terminal confirms that A-CSI feedback has been triggered, the terminal selects a suitable PUCCH resource from the pucch-csi-resourcelist of aperiodicOnPUCCH to feedback A-CSI. Specifically, if multiple PUCCH resources are included in the pucch-csi-resourcelist of aperiodicOnPUCCH, the terminal can select a suitable PUCCH resource according to the A-CSI feedback payload size, the maximum code rate supported by some PUCCH resources configured by RRC signaling, and the maximum number of PRB available for each PUCCH resource.

The base station can indicate to the terminal in which time unit the PUCCH resource carrying the A-CSI feedback is sent in the DL Grant that triggers the A-CSI feedback, where the time unit can include a slot, a sub slot, or an OFDM symbol. This can include adding a "ReportOffset indicator" field to the DL Grant that triggers A-CSI. This field can indicate which of multiple candidate ReportSlotOffsets configured by the base station through RRC signaling is used as the PUCCH from receiving the time unit from the DL Grant to carrying the A-CSI feedback. The time between the transmission time interval unit and the DL Grant can trigger a-CSI feedback from the DL Grant. Specifically, a plurality of candidate ReportSlotOffsets may be configured by a base station through RRC configuration signaling a trigger state of an associated ReportConfigInfoList of the CSI-ReportConfig of a reportSlotOffsetList.

Indicating to the terminal which time unit the PUCCH resource carrying the A-CSI feedback is sent in the DL Grant that triggers the A-CSI feedback can also include adding a SlotOffset field to the DL Grant that triggers A-CSI. This field can dynamically indicate the time difference between the PUCCH transmission time unit carrying the A-CSI and the PUCCH transmission time unit carrying the HARQ-ACK codebook. Specifically, the SlotOffset field may be configured to 0 or 1 or 2 bits through RRC signaling. When configured as 2 bits, the 4 states that can be indicated correspond to: −1 time unit, 0 time units, 1 time unit, 2 time units. The time unit can include a slot, a sub slot, or an OFDM symbol.

The PDSCH-to-HARQ feedback timing indicator field in the DL Grant that triggers A-CSI can be used to indicate in which time unit the PUCCH carrying A-CSI is sent, that is, HARQ-ACK and A-CSI can be sent in the same time unit.

Example Embodiment 3

In a third example embodiment, A-SCI feedback may be provided on a PUSCH.

A-CSI feedback may be triggered according to whether the DL Grant sent by the base station to the terminal and/or the terminal's decoding decision result of the PDSCH scheduled by the DL Grant is NACK. Once the terminal determines that it has triggered A-CSI feedback, the terminal may feedback A-CSI to the base station. The A-CSI feedback may be sent by the terminal to the base station on the PUSCH. Specifically, the A-CSI may be sent to the base station on a configured grant PUSCH that is semi-statically configured. The configured grant PUSCH may include a PUSCH time-frequency resource configured by the base station through RRC signaling and may not need to be scheduled through DL Grant before each transmission.

The terminal determines at least one configured grant PUSCH to send A-SCI in any of a plurality of methods. A first method can include the base station configuring one or more sets of configured grant PUSCH through RRC signaling to carry A-CSI. A second method can include any set configured grant PUSCHs can carrying A-CSI, when the terminal is triggered to feedback A-CSI, the terminal can use the most recent transmission opportunity of resource of a configured grant PUSCH to send the A-CSI feedback. A third way can include a base station adding a field in the DL Grant to dynamically indicate which set of configured grant PUSCH and/or which transmission opportunity the terminal uses to feedback A-SCI.

Example Embodiment 4

Figure 2:
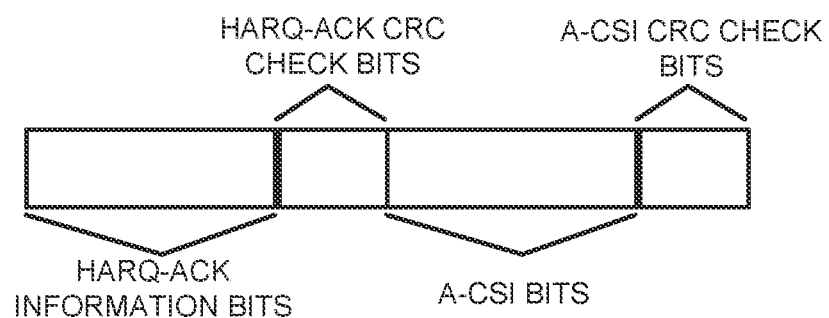
FIG. 2 is an example bitfield indicative of HARQ-ACK information and A-CSI information.

A fourth example embodiment may relate to how fields are organized when A-CSI is fed back on a PUCCH. FIG. 2 is an example bitfield 200 indicative of HARQ-ACK information and A-CSI information. For instance, for the method as described in Example Embodiment 1, a specific UCI field on PUCCH 0 in FIG. 1 is shown in FIG. 2.

For HARQ-ACK bits, encoding can be performed independently and several CRC check bits can be added. For the A-SCI bits, encoding can be performed independently and several CRC check bits are added. The HARQ-ACK bits are HARQ-ACK information bits. The A-CSI bits for CSI Report bits, may comprise 1 one or more first A-CSI feedback and/or one or more second A-CSI feedback.

After receiving PUCCH 0, the base station can first decode the HARQ-ACK bits, and then according to the HARQ-ACK bits, the number of the first A-CSI feedbacks included in the A-CSI bits can be determined by the base station. If there are other A-CSI feedbacks in addition to all the first A-CSI feedbacks in the A-CSI bits, the base station can determine that these A-CSI feedbacks may be the second A-CSI feedbacks.

Based on whether the base station has received all the A-CSI feedbacks triggered in one or more DL Grants corresponding to the previous HARQ-ACK codebook, the base station it can also determine whether the A-CSI bits in PUCCH0 contain the second A-CSI feedback and if second A-CSI feedback included in the A-CSI bits, the base station can determine the number of the second A-CSI feedbacks included in the A-CSI bits.

Figure 3:
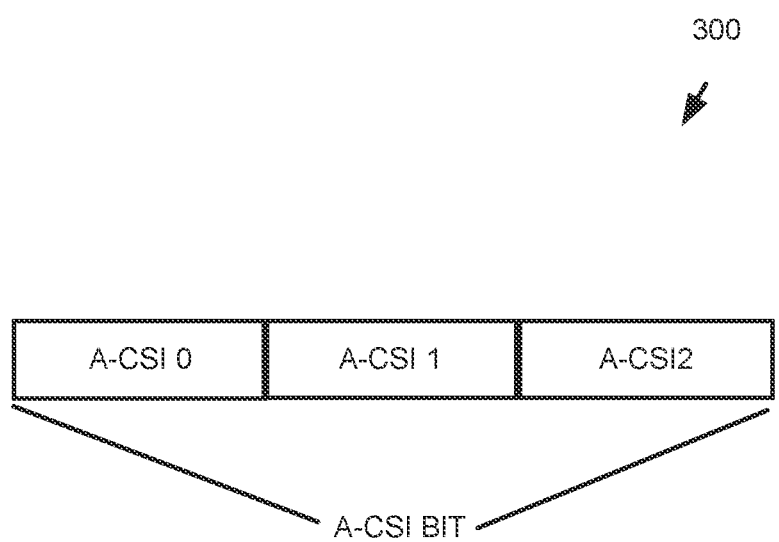
FIG. 3 is an example block diagram illustrating a bit field of A-CSI bits.

If the A-CSI bits includes multiple first A-CSI feedbacks, these first A-CSI feedbacks can be concatenated in the order in which they are triggered. FIG. 3 is an example block diagram illustrating a bit field 300 of A-CSI bits. As shown in FIG. 3, the A-CSI bits can include three first A-CSI feedbacks, which can be A-CSI 0, A-CSI 1, and A-CSI 2. The first DL Grant triggering the A-CSI 0 or the PDSCH scheduled by the first DL Grant must be sent before the second DL Grant triggering the A-CSI 1 or the PDSCH scheduled by the second DL Grant, while the second DL Grant triggering the A-CSI 1 or the PDSCH scheduled by the second DL Grant must be sent before the third DL Grant triggering the A-CSI 2 or the PDSCH scheduled by the third DL Grant.

When the terminal serially connects multiple first A-CSI feedbacks, it adopts at least one of the following methods.

For a missed GL grant, a specific value as A-CSI feedback may be provided, such as an all-zero bit string length of n, where n is a positive integer. For a DL Grant triggering the A-CSI feedback and the terminal missed the DL Grant, the terminal organizes the A-CSI feedback in the same order as the organization of HARQ-ACK bit in the HARQ-ACK dynamic codebook, so as to construct the A-CSI bits.

In some embodiments, For the PDSCH TB indicated as NACK in the HARQ-ACK codebook, if the base station did not trigger A-CSI feedback in the DL Grant scheduling the PDSCH TB, but the terminal feedbacks the first A-CSI, it may indicate that the terminal missed the DL Grant scheduling of the PDSCH TB. In this case, the base station may ignore or not use first A-CSI indicated by the terminal.

If the A-CSI bits include multiple second A-SCI feedbacks, these second A-CSI feedbacks were A-CSI feedbacks that should be feedback on the latest HARQ-ACK PUCCH resource. Due to the problem of time delay, there was not enough time to feedback these A-CSI on the latest HARQ-ACK PUCCH resource.

Example Embodiment 5

A fifth Example Embodiment can relate to a frequency range determination for A-CSI feedback. A-CSI feedback may be triggered according to whether decoding result of the PDSCH scheduled by the DL Grant is NACK. Once the terminal determines that it has triggered A-CSI feedback, the terminal may feedback A-CSI to the base station. The A-CSI feedback may be sent by the terminal to the base station on the PUCCH resource.

The A-CSI feedback may include channel quality information for one or more frequency domain resource units, and the frequency domain resource unit may be a carrier, a downlink BWP, a sub-band, or a PRB.

The specific channel quality information of which frequency domain resource units are included may be determined according to at least one of the frequency domain resource unit included in the frequency domain resource allocation of the PDSCH decoding result as NACK recently or a frequency domain resource unit included in one or more active SPS PDSCH frequency domain resource allocation.

Example Embodiment 6

A sixth Example Embodiment may relate to a priority of A-SCI feedback. If the PUCCH Resource cannot transmit all the A-CSI Reports that need to be fed back, when the maximum bit rate of the PUCCH and/or the maximum number of available PRBs of the PUCCH resource are semi-statically configured by the base station, the UE may sort according to a priority and ensure high priority Level A-CSI Report feedback.

A-CSI may be prioritized based on the base station indicating a CSI Report priority indication field in the DL Grant that triggers A-CSI, and the terminal can determine the priority of the A-CSI Report according to the instruction and send the higher-priority A-CSI Report when the payload is limited.

In some embodiments, prioritizing may include using Priority indicator field in DL Grant, determining the priority of the A-SCI Report according to the indication of this field, and sending the high-priority A-SCI Report first when the payload is limited.

In some embodiments, to ensure that at least one A-CSI Report is fed back to the base station for different carriers /BWP, and that the n-th A-CSI Report for the same carrier /BWP has lower priority than the A-CSI Report for the carrier /BWP with only one A-CSI Report, and the n is a positive integer greater than 1.

In some instances, the embodiment described in Example Embodiment 4 may include an A-CSI sequence of bits, a front position A-CSI Report in A-CSI bits has higher priority than a later one, i.e. the earlier the A-CSI is triggered, the higher the priority.

In some embodiments, the priority may be related to the triggering method of A-CSI. Different A-CSI triggering methods may have different priorities, which can be pre-defined or configured by the base station through RRC signaling. For example, if A-CSI needs to be triggered by whether the decoding result of PDSCH is NACK or not, its A-SCI Report has a higher priority than A-CSI Report that does not need to be triggered by whether the decoding result of PDSCH is NACK or not.

In some embodiments, the earlier the A-CSI is triggered, the higher the priority of the corresponding CSI Report.

In some embodiments, the later the A-CSI is triggered, the higher the priority of the corresponding CSI Report.

For a A-SCI that needs to be triggered based on whether the PDSCH decoding result is NACK, the earlier A-CSI is triggered, the higher the priority of its A-CSI Report. For A-CSI that is triggered without relying on whether the PDSCH decoding result is NACK, the later the A-CSI that is triggered, and the higher the priority of its A-CSI Report.

Figure 4:
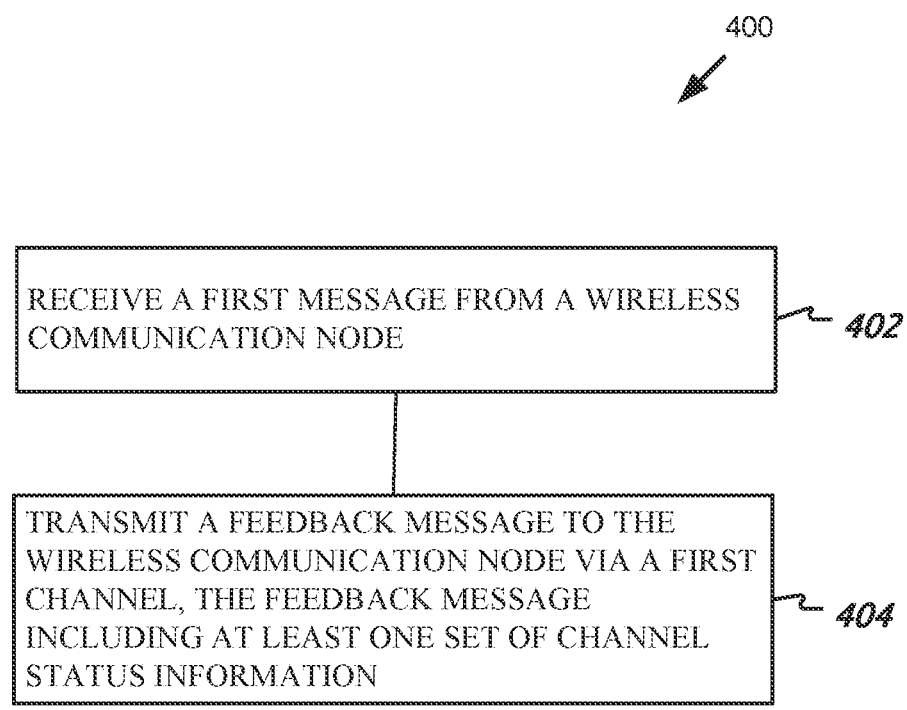
FIG. 4 is a block diagram of an example method for triggering feedback of channel state information.

FIG. 4 is a block diagram 400 of an example method for triggering feedback of channel state information. The method may include receiving, by a terminal, a first message from a wireless communication node (block 402). The first message may include a DL grant message as described herein. The first message can trigger feedback of A-CSI information to the wireless communication node, which may include the base station as described herein.

The method may also include transmitting, by the terminal, a feedback message to the wireless communication node via a first channel, the feedback message including at least one set of channel status information (block 404). The feedback message can provide A-CSI information to the wireless communication node.

In some embodiments, the method includes multiplexing, by the terminal, the at least one set of channel status information and hybrid automatic repeat request acknowledgement (HARQ-ACK) feedback information in a first resource of the first channel, wherein the first channel is a physical uplink control channel (PUCCH), and wherein the first resource is a first PUCCH resource of the first channel indicated by a first downlink control information (DCI).

In some embodiments, the first channel is a PUCCH, wherein the feedback message included in a second PUCCH resource that includes a second type of channel state information feedback, and wherein the second PUCCH resource is indicated by a first DCI or a second DCI that triggers the second type of channel state information feedback.

In some embodiments, the first message includes a PUCCH resource indicator field that is included in a DCI, wherein the feedback message is transmitted to the wireless communication node via a PUCCH resource indicated by the PUCCH resource indicator field that is included in the DCI.

In some embodiments, the first message includes a slot offset indicator field included in a DCI, wherein the feedback message is transmitted to the wireless communication node via the first channel in a slot, and wherein the slot is indicated by the slot offset indicator field included in the DCI.

In some embodiments, the slot offset indicator field includes any of a first time offset between a time unit in transmitting the first message and a time unit in receiving the feedback message in the first channel, a second time offset between an ending time unit in transmitting the first message and a starting time unit in receiving the feedback message in the first channel, a third time offset between a time unit in receiving HARQ-ACK feedback information and the time unit in receiving the feedback message in the first channel, and a fourth time offset between an ending time unit in receiving HARQ-ACK feedback information and the starting time unit in receiving the feedback message in the first channel.

In some embodiments, the feedback message is transmitted by the terminal responsive to expiration of a processing delay beginning upon reception of the first message, wherein the processing delay includes a number of time units between an ending time unit of reception of the first message and a starting time unit of the feedback message transmitted via the first channel.

In some embodiments, the at least one set of channel status information includes a first type of channel state information (SCI) feedback, the first type of CSI feedback including a series of CSI reports prepared by the terminal, and wherein a time duration between an ending time unit of a first DCI and a starting time unit of the first PUCCH resource is equal or greater than the processing delay, and wherein the first type of CSI feedback is transmitted in the first PUCCH resource by the terminal.

In some embodiments, the at least one set of channel status information includes a second type of CSI feedback, the second type of CSI feedback including a series of CSI reports that were not ready when transmitting the first PUCCH resource by the terminal, and wherein the time duration between the ending time unit of the first DCI and the starting time unit of the second PUCCH resource is greater than the processing delay.

In some embodiments, the terminal ignores an indication for a second PUCCH resource indicated in a DCI that triggers CSI feedback if the terminal does not identify any information indicative of the second type of CSI feedback.

In some embodiments, the method includes cancelling, by the terminal, the second type of CSI feedback based on at least one of: determining that a time duration between an ending time unit of the first message and a starting time unit of the first channel is larger than a first time threshold that is pre-defined, determining that a time duration between an ending time unit of the first message and a starting time unit of the first channel is larger than a first time threshold that is configured by the wireless communication node through RRC signaling, determining that there is no PUCCH resource indicator included in the first message, determining that there is no slot offset indicator indicated in the first message, determining that a trigger state indicated by a subsequent DCI corresponds to a trigger state in the first message, determining that a CSI report included in a subsequent type of CSI feedback corresponds to a CSI report included in the first message.

In some embodiments, the first channel is a configured grant PUSCH, wherein the at least one set of channel status information is included in the configured grant PUSCH.

In some embodiments, the method includes determining, by the terminal, that a configuration of the configured grant PUSCH is one of multiple configurations for a first type configured grant or one of multiple configurations for a second type configured grant, wherein the first type configured grant or second type configured grant is predefined by the terminal or configured by the wireless communication node.

In some embodiments, the at least one set of channel status information is transmitted in a recently available resource of the configured grant PUSCH.

In some embodiments, the at least one set of channel status information is transmitted in a configured grant PUSCH indicated by a DCI.

In some embodiments, the method includes concatenating, by the terminal, a number of sets of channel status information according to an order in which each set of channel status information was triggered, wherein each set of channel status information includes the first type of CSI feedback or the second type of CSI feedback.

In some embodiments, the method includes determining, by the terminal, that the at least one set of channel status information exceeds a maximum bit rate of a PUCCH resource associated with the feedback message and/or a maximum number of available physical resource blocks (PRBs) for the PUCCH resource associated with the feedback message; and sorting, by the terminal, each set of channel status information according to the order in which each set of channel status information was triggered.

In some embodiments, the method includes inspecting, by the terminal, the first message to identify a CSI report priority indication field that triggers transmission of the feedback message; determining, by the terminal, a first set of channel status information with a greater priority than that of a second set of channel status information; and transmitting, by the terminal, the feedback message that includes the first set of channel status information based on determining that the first set of channel status information with the greater priority than that of the second set of channel status information.

In some embodiments, the method includes inspecting, by the terminal, the first message to identify a downlink (DL) grant priority indicator; determining, by the terminal, a priority of each set of channel status information; and adding, by the terminal, a set of channel status information with a highest priority to the feedback message.

In some embodiments, the first message includes information indicative of a processing delay in transmission of the feedback message, wherein the processing delay is provided as any of a slot, a sub-slot, and/or an orthogonal frequency-division multiplexing (OFDM) symbol.

In some embodiments, the method includes dividing, by the terminal, a number of instances of each set of channel status information into multiple PUCCH resources, wherein the multiple PUCCH resources are included in the feedback message.

In some embodiments, the first message is a downlink (DL) grant message that includes an added PUCCH resource indicator in a channel state information (CSI) field of the first message, wherein the added PUCCH resource indicator indicates a first PUCCH resource and triggers the terminal to send each set of channel status information in the first PUCCH resource via the feedback message.

In some embodiments, the method includes responsive to determining that the first message includes an indication to transmit the at least one set of channel status information in the feedback message, selecting, the terminal, a PUCCH resource from a list of aperiodic PUCCH resources to feedback the at least one set of channel status information in the feedback message.

In some embodiments, the feedback message includes at least one HARQ-ACK information bit, at least one HARQ-ACK Cyclic Redundancy Error (CRC) check bit, at least one aperiodic channel state information (A-CSI) bit, and at least one A-CSI CRC check bit.

In some embodiments, the at least one HARQ-ACK information bit indicates a PDSCH transport block (TB) that is a NACK.

In some embodiments, the feedback message includes channel quality information for one or more frequency domain resource units, wherein the frequency domain resource unit includes any of a downlink bandwidth part (BWP), a sub-band, and a physical resource block (PRB).

In another embodiment, a method for wireless communication comprises transmitting, by a wireless communication node, a first message to a terminal, the first message including an indication to transmit at least one set of channel status information to the wireless communication node; and receiving, by the wireless communication node, a feedback message from the terminal via a first channel responsive to transmitting the first message to the terminal.

In some embodiments, the feedback message includes the at least one set of channel status information multiplexed with hybrid automatic repeat request acknowledgement (HARQ-ACK) feedback information in a first resource of the first channel, wherein the first channel is a physical uplink control channel (PUCCH), and wherein the first resource is a first PUCCH resource of the first channel indicated by a first downlink control information (DCI).

In some embodiments, the first channel is a PUCCH, wherein the feedback message included in a second PUCCH resource that includes a second type of channel state information feedback, and wherein the second PUCCH resource is indicated by a first DCI or a second DCI that triggers the second type of channel state information feedback.

In some embodiments, the first message includes a PUCCH resource indicator field that is included in a DCI, wherein the feedback message is transmitted to the wireless communication node via a PUCCH resource indicated by the PUCCH resource indicator field that is included in the DCI.

In some embodiments, the first message includes a slot offset indicator field included in a DCI, wherein the feedback message is transmitted to the wireless communication node via the first channel in a slot, and wherein the slot is indicated by the slot offset indicator field included in the DCI.

In some embodiments, the slot offset indicator field includes any of a first time offset between a time unit in receiving the first message and a time unit in transmitting the first message in the first channel, a second time offset between an ending time unit in receiving the first message and a starting time unit in transmitting the feedback message in the first channel, a third time offset between a time unit in transmitting HARQ-ACK feedback information and the time unit in transmitting the feedback message in the first channel, and a fourth time offset between an ending time unit in transmitting HARQ-ACK feedback information and the starting time unit in transmitting the first message in the first channel.

In some embodiments, the feedback message is transmitted by the terminal responsive to expiration of a processing delay beginning upon reception of the first message, wherein the processing delay includes a number of time units between an ending time unit of reception of the first message and a starting time unit of the feedback message transmitted via the first channel.

In some embodiments, the at least one set of channel status information includes a first type of channel state information (SCI) feedback, the first type of CSI feedback including a series of CSI reports prepared by the terminal, and wherein a time duration between an ending time unit of a first DCI and a starting time unit of the first PUCCH resource is equal or greater than the processing delay, and wherein the first type of CSI feedback is transmitted in the first PUCCH resource by the terminal.

In some embodiments, the at least one set of channel status information includes a second type of CSI feedback, the second type of CSI feedback including a series of CSI reports that were not ready when transmitting the first PUCCH resource by the terminal, and wherein the time duration between the ending time unit of the first DCI and the starting time unit of the second PUCCH resource is greater than the processing delay.

In some embodiments, the first channel is a configured grant PUSCH, wherein the at least one set of channel status information is included in the configured grant PUSCH.

In some embodiments, the at least one set of channel status information is transmitted in a configured grant PUSCH indicated by a DCI.

In some embodiments, the wireless communication node configures at least one configured grant PUSCH resource as the first channel through RRC signaling, wherein the configured grant PUSCH resource can be a second type configured grant PUSCH resource or a first type configured grant PUSCH resource.

In some embodiments, the wireless communication node indicates an available configured grant PUSCH resource used for transmitting at least one set of channel status information in a DCI triggering the feedback message.

In some embodiments, the wireless communication node configures a type of CSI feedback can be fed back in the configured grant PUSCH through RRC signaling, wherein the type of CSI feedback is one of the first type of CSI feedback and the second type of CSI feedback.

Example Wireless System

Figure 5:
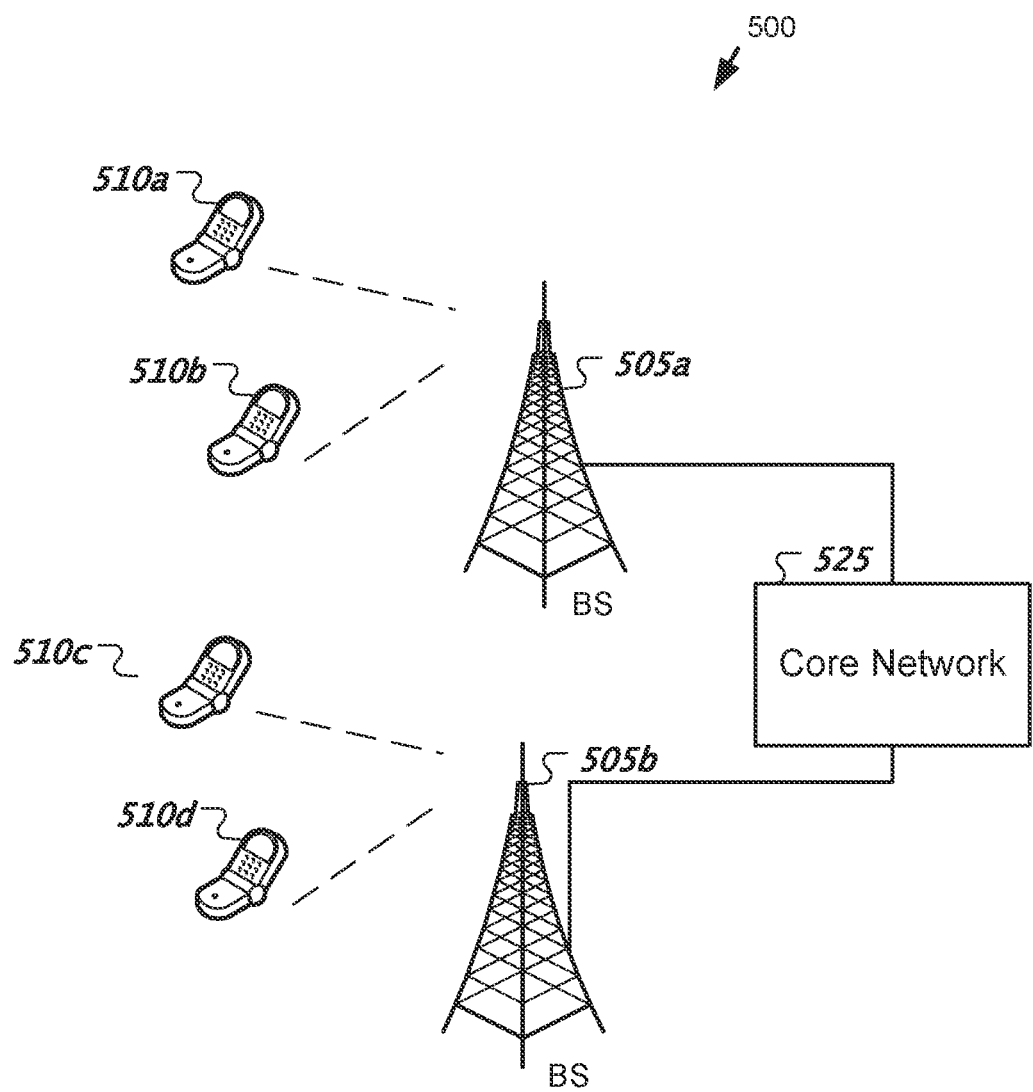
FIG. 5 shows an example of a wireless communication system where techniques in accordance with one or more embodiments of the present technology can be applied.

FIG. 5 shows an example of a wireless communication system where techniques in accordance with one or more embodiments of the present technology can be applied. A wireless communication system 500 can include one or more base stations (BSs) 505a, 505b, one or more wireless devices 510a, 510b, 510c, 510d, and a core network 525. A base station 505a, 505b can provide wireless service to wireless devices 510a, 510b, 510c and 510d in one or more wireless sectors. In some implementations, a base station 505a, 505b includes directional antennas to produce two or more directional beams to provide wireless coverage in different sectors.

The core network 525 can communicate with one or more base stations 505a, 505b. The core network 525 provides connectivity with other wireless communication systems and wired communication systems. The core network may include one or more service subscription databases to store information related to the subscribed wireless devices 510a, 510b, 510c, and 510d. A first base station 505a can provide wireless service based on a first radio access technology, whereas a second base station 505b can provide wireless service based on a second radio access technology. The base stations 505a and 505b may be co-located or may be separately installed in the field according to the deployment scenario. The wireless devices 510a, 510b, 510c, and 510d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 6:
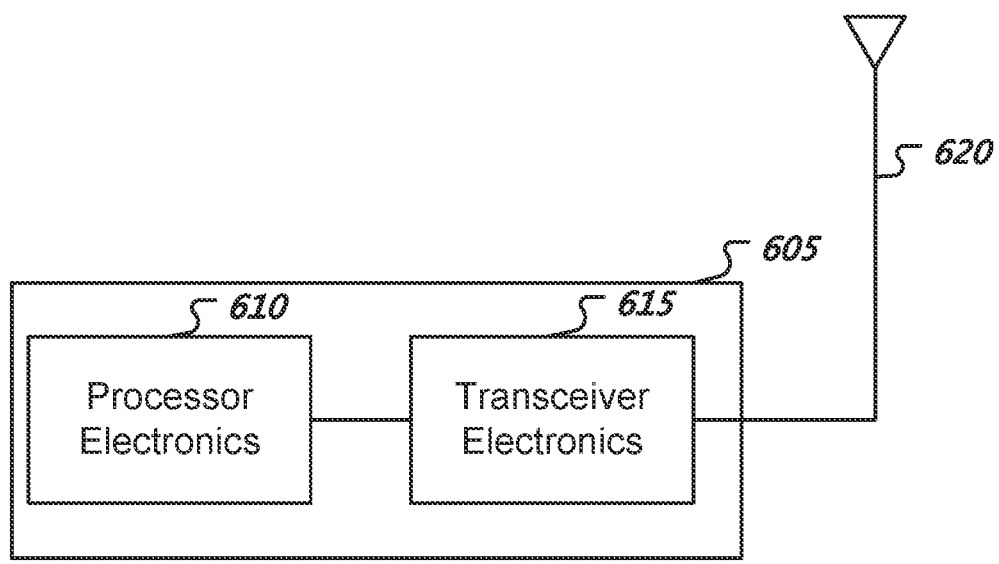
FIG. 6 is a block diagram representation of a portion of a hardware platform.

FIG. 6 is a block diagram representation of a portion of a hardware platform. A hardware platform 605 such as a network device or a base station or a wireless device (or UE) can include processor electronics 610 such as a microprocessor that implements one or more of the techniques presented in this document. The hardware platform 605 can include transceiver electronics 615 to send and/or receive wired or wireless signals over one or more communication interfaces such as antenna 620 or a wireline interface. The hardware platform 605 can implement other communication interfaces with defined protocols for transmitting and receiving data. The hardware platform 605 can include one or more memories (not explicitly shown) configured to store information such as data and/or instructions. In some implementations, the processor electronics 610 can include at least a portion of the transceiver electronics 615. In some embodiments, at least some of the disclosed techniques, modules or functions are implemented using the hardware platform 605.

CONCLUSION

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   receiving, by a terminal, a first message from a wireless communication node;
   inspecting, by the terminal, the first message to identify a CSI report priority indication field that triggers transmission of a feedback message;
   determining, by the terminal, a first set of channel status information (CSI) with a greater priority than that of a second set of CSI;
   transmitting, by the terminal, the feedback message to the wireless communication node via a first channel responsive to receiving the first message from the wireless communication node, the feedback message including a series of CSI reports that are concatenated according to an order in which the series of CSI reports were triggered by respective downlink messages received by the terminal, wherein the series of CSI reports includes the first set of CSI based on the CSI report priority indication field and wherein a front position CSI report has a greater priority than a later position CSI report; and
   multiplexing, by the terminal, at least one of series of CSI reports and hybrid automatic repeat request acknowledgement (HARQ-ACK) feedback information in a first resource of the first channel,
   wherein the first channel is a physical uplink control channel (PUCCH), and
   wherein the first resource is a first PUCCH resource of the first channel indicated by a first downlink control information (DCI).

2. The method of claim 1, wherein the feedback message is included in a second PUCCH resource that includes a second type of channel state information feedback, and wherein the second PUCCH resource is indicated by a first DCI or a second DCI that triggers the second type of channel state information feedback.

3. The method of claim 1, wherein the first message includes a PUCCH resource indicator field that is included in a DCI, wherein the feedback message is transmitted to the wireless communication node via a PUCCH resource indicated by the PUCCH resource indicator field that is included in the DCI.

4. The method of claim 1, wherein the first message includes a slot offset indicator field included in a DCI, wherein the feedback message is transmitted to the wireless communication node via the first channel in a slot, and wherein the slot is indicated by the slot offset indicator field included in the DCI.

5. The method of claim 1, wherein the series of CSI reports includes a first type of channel state information (CSI) feedback prepared by the terminal, and wherein a time duration between an ending time unit of a first DCI and a starting time unit of the first PUCCH resource is equal or greater than a processing delay, and wherein the first type of CSI feedback is transmitted in the first PUCCH resource by the terminal.

6. The method of claim 1, wherein the series of CSI reports includes a second type of CSI feedback including one or more CSI reports that were not ready when transmitting the first PUCCH resource by the terminal, and wherein a time duration between an ending time unit of the first DCI and a starting time unit of a second PUCCH resource is greater than a processing delay.

7. The method of claim 1, further comprising:
inspecting, by the terminal, the first message to identify a downlink (DL) grant priority indicator;
determining, by the terminal, a priority of each set of channel status information; and
adding, by the terminal, a set of channel status information with a highest priority to the feedback message.

8. The method of claim 1, wherein the first message includes information indicative of a processing delay in transmission of the feedback message, wherein the processing delay is provided as any of a slot, a sub-slot, and/or an orthogonal frequency-division multiplexing (OFDM) symbol.

9. The method of claim 1, further comprising:
dividing, by the terminal, a number of instances of each set of channel status information into multiple PUCCH resources, wherein the multiple PUCCH resources are included in the feedback message.

10. A method for wireless communication, comprising:
transmitting, by a wireless communication node, a first message to a terminal, the first message including an indication to transmit at least one set of channel status information to the wireless communication node and a CSI report priority indication field; and
receiving, by the wireless communication node, a feedback message from the terminal via a first channel responsive to transmitting the first message to the terminal,
wherein the feedback message includes a series of CSI reports that are concatenated according to an order in which series of CSI reports were triggered by respective downlink messages received by the terminal and includes a front position CSI report with a greater priority than a later position CSI report, at least one of the series of CSI reports being multiplexed with hybrid automatic repeat request acknowledgement (HARQ-ACK) feedback information in a first resource of the first channel,
wherein the series of CSI reports includes a first set of CSI with a greater priority than that of a second set of CSI based on the CSI report priority indication field of the first message,
wherein the first channel is a physical uplink control channel (PUCCH), and
wherein the first resource is a first PUCCH resource of the first channel indicated by a first downlink control information (DCI).

11. The method of claim 10, wherein the feedback message is included in a second PUCCH resource that includes a second type of channel state information feedback, and wherein the second PUCCH resource is indicated by a first DCI or a second DCI that triggers the second type of channel state information feedback.

12. The method of claim 10, wherein the first message includes a PUCCH resource indicator field that is included in a DCI, wherein the feedback message is transmitted to the wireless communication node via a PUCCH resource indicated by the PUCCH resource indicator field that is included in the DCI.

13. The method of claim 10, wherein the first message includes a slot offset indicator field included in a DCI, wherein the feedback message is transmitted to the wireless communication node via the first channel in a slot, and wherein the slot is indicated by the slot offset indicator field included in the DCI.

14. The method of claim 10, wherein the series of CSI reports includes a first type of channel state information (CSI) feedback prepared by the terminal, and wherein a time duration between an ending time unit of a first DCI and a starting time unit of the first PUCCH resource is equal or greater than a processing delay, and wherein the first type of CSI feedback is transmitted in the first PUCCH resource by the terminal.

15. The method of claim 10, wherein the series of CSI reports includes a second type of CSI feedback, the second type of CSI feedback including one or more CSI reports that were not ready when receiving the first PUCCH resource by the terminal, and wherein a time duration between an ending time unit of the first DCI and a starting time unit of a second PUCCH resource is greater than a processing delay.

16. The method of claim 10, wherein the first channel is a configured grant PUSCH, wherein the at least one set of channel status information is included in the configured grant PUSCH, and wherein the wireless communication node configures at least one configured grant PUSCH resource as the first channel through RRC signaling.

17. The method of claim 16, wherein the configured grant PUSCH resource is any of a second type configured grant PUSCH resource or a first type configured grant PUSCH resource.

18. An apparatus for wireless communication comprising a processor and a memory storing instructions that, when executed by the processor, cause the apparatus to:
receive a first message from a wireless communication node;
inspect the first message to identify a CSI report priority indication field that triggers transmission of a feedback message;
determine a first set of channel status information (CSI) with a greater priority than that of a second set of CSI;
transmit the feedback message to the wireless communication node via a first channel responsive to receiving the first message from the wireless communication node, the feedback message including a series of CSI reports that are concatenated according to an order in which the series of CSI reports were triggered by respective downlink messages, wherein the series of CSI reports includes the first set of CSI based on the CSI report priority indication field and wherein a front position CSI report has a higher priority than a later position CSI report; and
multiplex at least one of the series of CSI reports and hybrid automatic repeat request acknowledgement (HARQ-ACK) feedback information in a first resource of the first channel,
wherein the first channel is a physical uplink control channel (PUCCH), and
wherein the first resource is a first PUCCH resource of the first channel indicated by a first downlink control information (DCI).

19. The apparatus for wireless communication of claim 18, wherein the first message includes information indicative of a processing delay in transmission of the feedback message, wherein the processing delay is provided as any of a slot, a sub-slot, and/or an orthogonal frequency-division multiplexing (OFDM) symbol.

20. The apparatus for wireless communication of claim 18, wherein the instructions further cause the apparatus to:
divide a number of instances of each set of channel status information into multiple PUCCH resources, wherein the multiple PUCCH resources are included in the feedback message.

21. An apparatus for wireless communication comprising a processor and a memory storing instructions that, when executed by the processor, cause the apparatus to:
- transmit a first message to a terminal, the first message including an indication to transmit at least one set of channel status information to a wireless communication node and a CSI report priority indication field; and
- receive a feedback message from the terminal via a first channel responsive to transmitting the first message to the terminal,
  - wherein the feedback message includes a series of CSI reports that are concatenated according to an order in which series of CSI reports were triggered by respective downlink messages received by the terminal and that includes a front position CSI report with a greater priority than a later position CSI report, at least one of the series of CSI reports being multiplexed with hybrid automatic repeat request acknowledgement (HARQ-ACK) feedback information in a first resource of the first channel,
  - wherein the series of CSI reports includes a first set of CSI with a greater priority than that of a second set of CSI based on the CSI report priority indication field of the first message,
  - wherein the first channel is a physical uplink control channel (PUCCH), and
  - wherein the first resource is a first PUCCH resource of the first channel indicated by a first downlink control information (DCI).

* * * * *